(12) United States Patent
Brock et al.

(10) Patent No.: US 7,698,795 B2
(45) Date of Patent: Apr. 20, 2010

(54) MANUAL CLUTCH ASSEMBLY AND SERVICE TOOL

(75) Inventors: Thomas A. Brock, Fenton, MI (US);
Mark R. Chapman, Brighton, MI (US);
Gerald J. Zalewski, Brighton, MI (US)

(73) Assignee: GM Global Technology Operations, Inc., Detroit, MI (US)

( * ) Notice: Subject to any disclaimer, the term of this patent is extended or adjusted under 35 U.S.C. 154(b) by 0 days.

(21) Appl. No.: 11/745,040

(22) Filed: May 7, 2007

(65) Prior Publication Data

US 2008/0276768 A1 Nov. 13, 2008

(51) Int. Cl.
*B25B 27/14* (2006.01)
(52) U.S. Cl. .............................. 29/274; 29/278; 29/255
(58) Field of Classification Search .................. 29/274, 29/275, 278, 255, 263, 259, 270
See application file for complete search history.

(56) References Cited

U.S. PATENT DOCUMENTS

| 1,682,956 | A | * | 9/1928 | Dawson et al. | 29/246 |
| 2,376,721 | A | * | 5/1945 | Piper | 29/261 |
| 3,611,540 | A | * | 10/1971 | Gibu | 29/263 |
| 2008/0276768 | A1 | * | 11/2008 | Brock et al. | 81/429 |

* cited by examiner

*Primary Examiner*—Lee D Wilson

(57) ABSTRACT

An assembly tool for installing a clutch pressure plate and clutch housing of a manual clutch on the flywheel of an engine includes a bell shaped housing which receives and pivotally supports a plurality of fingers having outwardly directed claws. A coaxial cylindrical portion of the bell shaped housing includes male threads which receive a complementarily threaded collar which may be rotated to engage, radially extend and retract the fingers. Internal threads in the cylindrical portion of the housing receive a complementarily threaded portion of a push rod. The push rod includes a thrust bearing at an end that engages the fingers of the pressure plate and may be rotated to engage, retract and extend the pressure plate. A method of clutch housing installation utilizing the tool is also disclosed.

23 Claims, 4 Drawing Sheets

MANUAL CLUTCH ASSEMBLY AND SERVICE TOOL

FIELD

The present disclosure relates to tools for assembling and servicing clutches and more particularly to a tool for facilitating assembly and servicing of a manual clutch on an engine.

BACKGROUND

The statements in this section merely provide background information related to the present disclosure and may or may not constitute prior art.

The assembly and attachment of a manual clutch and particularly the clutch housing to an engine flywheel is rendered difficult by the extended position of the pressure plate. This extended position of the pressure plate is the result of the unrestrained force and consequent movement of the pressure plate by the springs which, in normal operation, achieve and maintain clutch engagement. In order to readily and properly install the pressure plate and mount the clutch housing to the flywheel, it is necessary to temporarily retract the pressure plate by overcoming or neutralizing the force generated by the engagement springs.

Various installation methods and tools to achieve this have been proposed, many with mixed results. One approach comprehends providing bolts having sufficient length that they are capable of engaging the flywheel with the pressure plate fully extended. The bolts are then laboriously, sequentially advanced, typically only one-third of their length at a time, until they contact the flywheel at which time they are tightened in sequence to the proper torque specification. Because of the time and numerous steps involved in this process, it is often not properly executed resulting in improperly tightened fasteners and a warped clutch housing.

Other procedures comprehend the use of specialized tools. One such procedure involves temporarily mounting a transmission bell housing to the engine. A tool which engages the fingers of the pressure plate is attached to the bell housing and a threaded member is rotated which collapses the spring assembly to remove pressure on the pressure plate and facilitate mounting of the clutch housing to the flywheel. The fasteners may then be tightened to the proper torque specification in any order and the tool and bell housing removed.

SUMMARY

The present invention provides an assembly tool and method for installing a clutch pressure plate and clutch housing of a manual clutch on the flywheel of an engine. The tool includes a bell shaped housing which receives and pivotally supports a plurality of fingers having outwardly directed claws. A coaxial cylindrical portion of the bell shaped housing includes male threads which receive a complementarily threaded collar which may be rotated to engage, radially extend and retract the fingers. Internal threads in the cylindrical portion of the housing receive a complementarily threaded portion of a push rod. The push rod includes a thrust bearing at an end that engages the fingers of the pressure plate and may be rotated to engage, retract and extend the pressure plate.

It is thus an object of the present invention to provide a manual clutch housing installation tool.

It is a further object of the present invention to provide a manual clutch housing installation and service tool.

It is a still further object of the present invention to provide a method of installing a clutch housing and servicing a manual clutch utilizing the tool of the present invention.

Further areas of applicability will become apparent from the description provided herein. It should be understood that the description and specific examples are intended for purposes of illustration only and are not intended to limit the scope of the present disclosure.

DRAWINGS

The drawings described herein are for illustration purposes only and are not intended to limit the scope of the present disclosure in any way.

Figure 3:
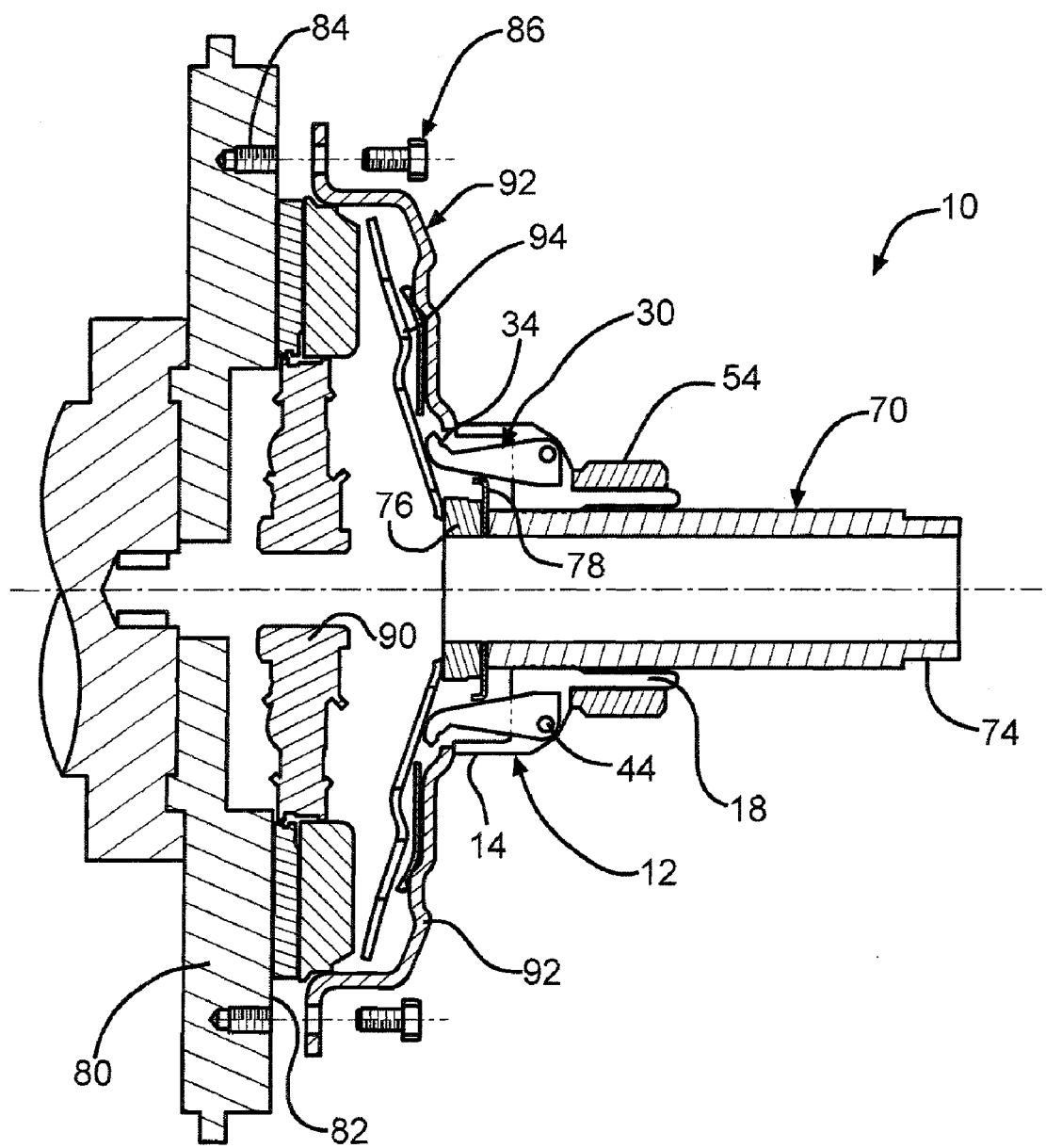
Figure 4:
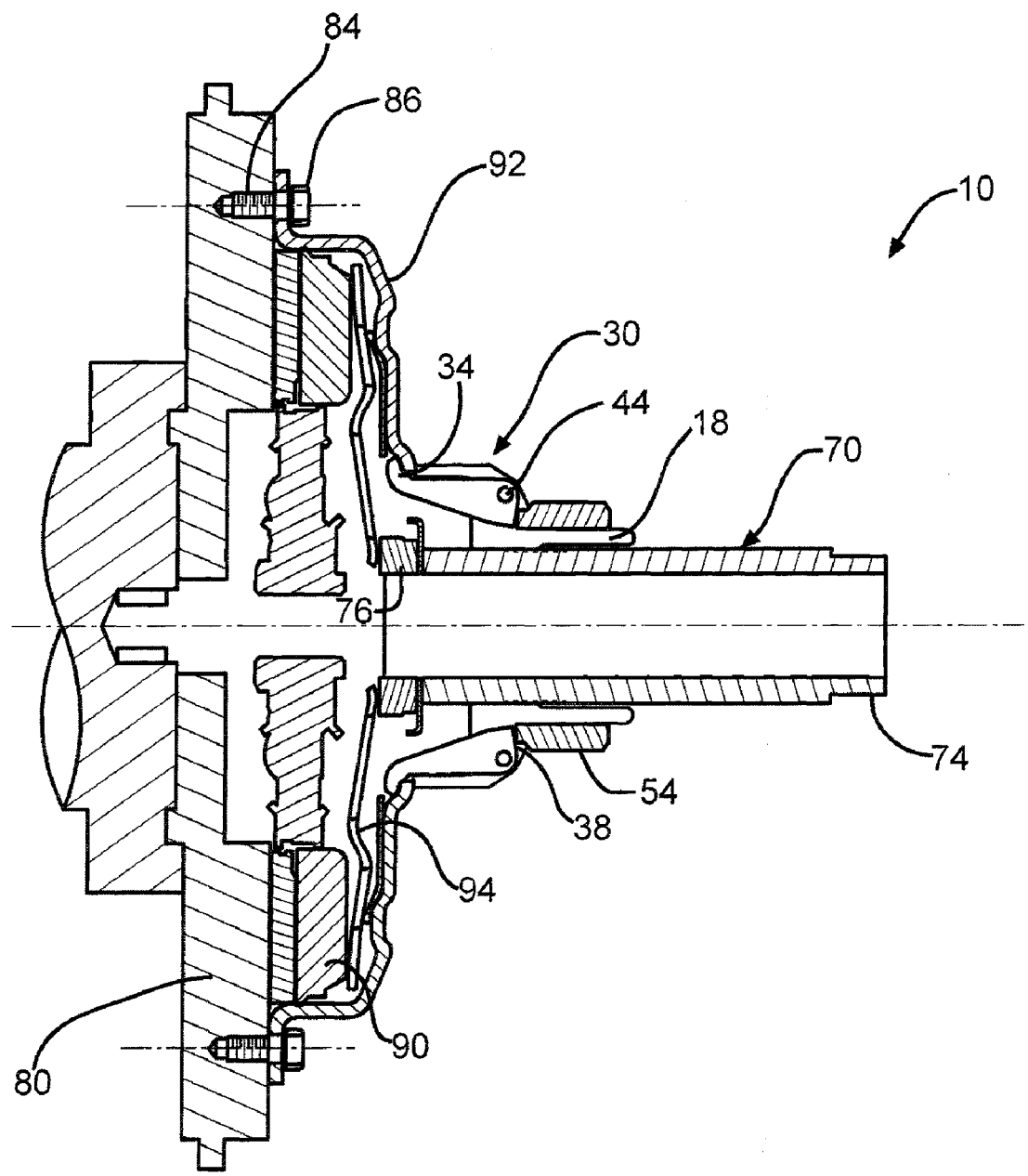

FIG. 3 is a full sectional view of a typical manual clutch having the installation and service tool according to the present invention mounted thereon at the beginning of the housing installation process; and FIG. 4 is a full sectional view of a typical manual clutch having the installation and service tool according to the present invention mounted thereon at the end of the housing installation process.

DETAILED DESCRIPTION

The following description is merely exemplary in nature and is not intended to limit the present disclosure, application, or uses.

Figure 1:
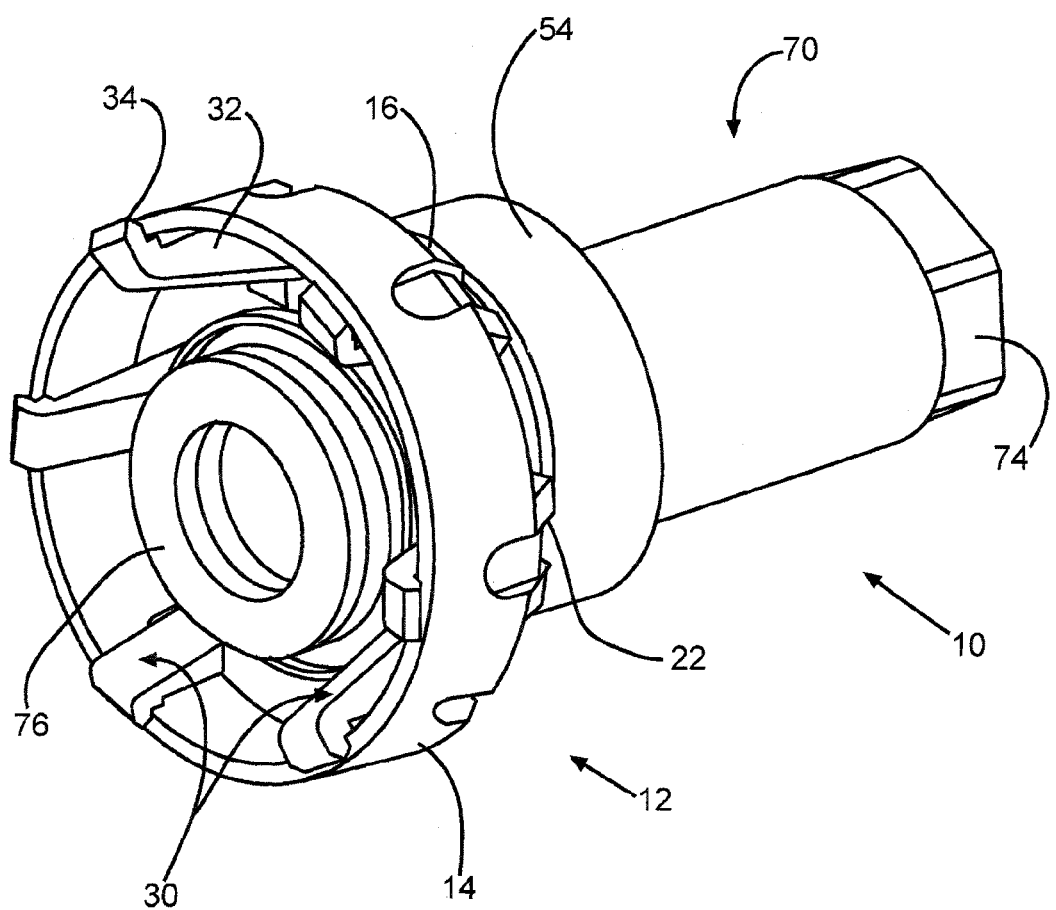
FIG. 1 is a perspective view of a manual clutch installation and service tool according to the present invention.
Figure 2:
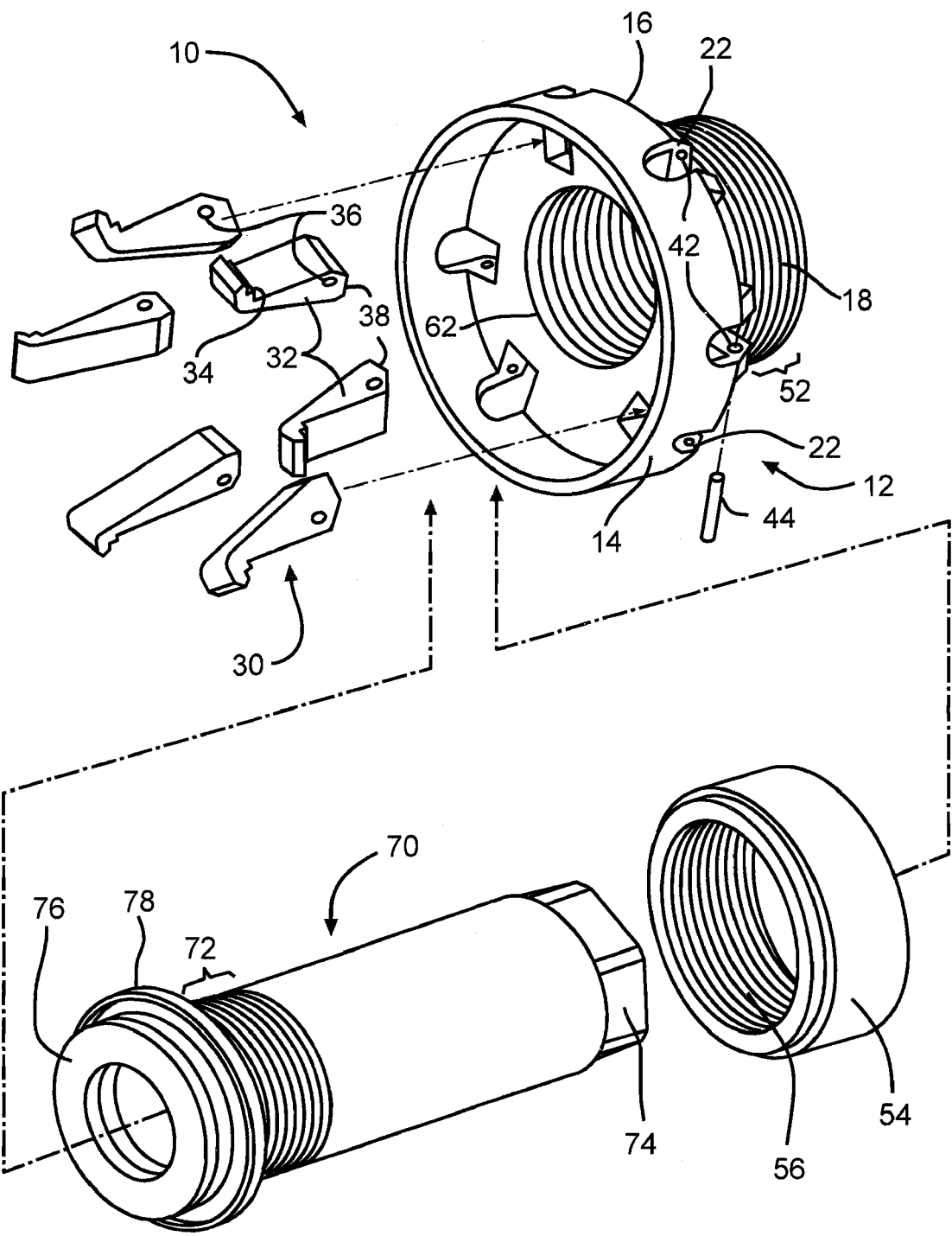
FIG. 2 is an exploded perspective view of the manual clutch installation and service tool according to the present invention.

Referring now to FIGS. 1 and 2, a manual clutch assembly and service tool is illustrated and designated by the reference number 10. The clutch tool 10 includes a cylindrical, generally bell-shaped housing 12 defining a first, larger diameter front portion 14, a second, intermediate frusto-conical portion 16 and a third, smaller diameter rear portion 18. Extending from the rear of the first, front portion 14 of the housing 12 and into the second, intermediate portion 16 of the housing 12 are a plurality of axially extending cutouts or slots 22. The plurality of cutouts or slots 22 are preferably six in number although other numbers of cutouts or slots 22 such as three or four may be utilized. Preferably, as well, the plurality of cutouts or slots 22 are equally circumferentially spaced about the housing 12. That is, if three cutouts or slots 22 are utilized, they are spaced 120 degrees apart and if six cutouts or slots 22 are present, they are spaced 60 degrees apart. It will be appreciated, however, that other, for example, irregular, arrangements of the cutout or slots 22 may best suit a particular clutch application and that such variations are within the purview of the present invention.

Each of the axially extending cutouts or slots 22 receive an engagement pawl, lever or finger 30 having a generally triangular body 32 defining a latch or claw 34 at a first, forward end, a through transverse or circumferentially tangent bore or opening 36 and a flat, radially extending surface 38 at the other end. The housing 12 includes pairs of aligned bores or openings 42 on opposite sides of each of the cutouts or slots 22 which cooperatively receive and locate a plurality of retaining pins 44. The retaining pins 44 extend through the openings 36 in the levers or fingers 30 and pivotally retain them in the cutouts or slots 22 in the housing 12. The retaining pins 44 may be staked in the bores or openings 42 or restrained therein by other conventional and well known means such as a friction fit.

The outer surface of the third, rear portion 18 of the housing 12 includes external or male threads 52 which receive a ring nut or collar 54 having complementary internal or female threads 56. If desired, the exterior surface of the ring nut or collar 54 may include, for example, knurling or flats (both not illustrated) to facilitate torque application thereto. Bi-directional rotation of the ring nut or collar 54 translates it toward and away from the first, front portion 14 of the housing 12 and radially extends and retracts the levers or fingers 30.

The inner surface of the third, rear portion 18 of the housing 12 includes internal or female threads 62 which receive a handle or push rod 70 having complementary external or male threads 72 along a forward portion of its length. The handle or push rod 70 is, as illustrated, an elongate, preferably hollow tube. The hollow, tubular configuration of the handle or push rod 70 provides clearance for any associated tools such as a crankshaft pilot bearing alignment tool (not illustrated) which may also be utilized during the assembly process. In addition to the male threads 72, the handle or push rod 70 also includes a plurality of tool, i.e., wrench or socket, engageable flats 74, preferably in a hexagonal arrangement at the rear of the handle or push rod 70 and a thrust bearing 76 secured to the front of the handle or push rod 70. The thrust bearing 76 ensures ease of rotation of the handle or push rod 70 notwithstanding its engagement and rotation against stationary members. The handle or push rod 70 also includes a finger locating disc 78 disposed behind the thrust bearing 76. The finger locating disc 78 engages the inside surface of the plurality of levers or fingers 30 and prevents them from pivoting inwardly beyond a certain radial position Referring now to FIGS. 3 and 4, use of the clutch assembly and service tool 10 during the assembly of a pressure plate and clutch housing to a flywheel of an engine will now be described. At the outset, it should be appreciated that the following process may be reversed to accomplish servicing or replacement of a clutch. As illustrated in FIG. 3, a flywheel 80 of an internal combustion engine (not illustrated) includes a friction surface 82 and a plurality of blind, threaded bores 84 adapted to receive attachment bolts 86. A clutch plate 90 is disposed adjacent the flywheel 80. A clutch housing 92 having a pressure plate 94 is shown generally in pre-assembly position, axially spaced from the flywheel 80 and the clutch plate 90.

The assembly and service tool 10 according to the present invention is positioned on the axis of the clutch housing 92 with the levers or fingers 30 inside the rear opening of the clutch housing 92. The ring nut or collar 54 is rotated clockwise to engage the flat surfaces 38 of the engagement pawls, levers or fingers 30, radially extend the levers or fingers 30 and, specifically, to engage the latches or claws 34 on the inside, rear surface of the clutch housing 92.

In FIG. 4, this step has been completed and the latches or claws 34 of the fingers 30 are tightly gripping the clutch housing 92 and concentrically positioning and locating the assembly and service tool 10 thereon. Next, the handle or push rod 70 is rotated clockwise, using a wrench or other torque enhancing tool (not illustrated) on the flats 74, if necessary. Such rotation of the handle or push rod 70 advances it toward the pressure plate 94 and pivots the sections of the pressure plate 94, retracting them and effectively neutralizing the force of the pressure plate springs (not illustrated). At this time, the attachment bolts 86 may be readily installed and tightened to the proper torque specification. Removal of the tool 10 is quickly accomplished by rotating the handle or push rod 70 counter-clockwise to allow the pressure plate 94 to clamp the clutch plate 90. Finally, the ring nut or collar 54 is rotated counter-clockwise to retract the levers or fingers 30 and allow removal of the tool 10 from the clutch housing 94.

The description of the invention is merely exemplary in nature and variations that do not depart from the gist of the invention are intended to be within the scope of the invention. Such variations are not to be regarded as a departure from the spirit and scope of the invention.

What is claimed is:

1. An installation and service tool for a clutch comprising:
    a cylindrical housing having a larger diameter region and a smaller diameter region, said larger diameter region defining a clutch contact surface and said smaller diameter region defining external and internal threads,
    a plurality of fingers each having a first end with a radially extending latch and a second end pivotally disposed in said larger diameter region, and wherein the latch is disposed proximate and directly opposite said clutch contact surface of said larger diameter region,
    a collar having internal threads complementary to said external threads of said housing and disposed for rotation thereon, and
    a cylindrical member having external threads complementary to said internal threads on said housing and disposed for rotation therein.

2. The installation and service tool of claim 1 further including a thrust bearing on a first end of said cylindrical member.

3. The installation and service tool of claim 1 wherein the collar is rotatable about the small diameter portion of the housing and engageable with the second end of the plurality of fingers.

4. The installation and service tool of claim 1 wherein said fingers have ends defining radially extending claws.

5. The installation and service tool of claim 1 wherein said fingers each define a through passageway for receiving a pivot pin.

6. The installation and service tool of claim 1 wherein said cylindrical member defines hexagonal flats on one end.

7. The installation and service tool of claim 1 further including a disc disposed on said cylindrical member for limiting inward travel of said fingers.

8. The installation and service tool of claim 1 wherein said cylindrical member is a tube.

9. An installation and service tool for a manual clutch comprising:
    a bell housing having a larger diameter region and a smaller diameter region, said larger diameter region having an end opposite said smaller diameter region and said smaller diameter region defining external and internal threads;
    a plurality of fingers each having a first end extended radially outward from a center axis of the cylindrical housing and a second end pivotally disposed in said larger diameter region, wherein each of said first ends of said plurality of fingers further include a flat surface that is disposed opposite said end of said larger diameter region;
    a collar having internal threads complementary to said external threads of said housing and disposed for rotation thereon and engagement of said second end of said fingers, and
    an elongate member having external threads complementary to said internal threads on said housing and disposed for rotation therein.

10. The installation and service tool of claim 9 further including a thrust bearing on a first end of said elongate member.

11. The installation and service tool of claim 10 wherein said fingers have ends defining radially extending claws.

12. The installation and service tool of claim 10 wherein said fingers each define a through passageway for receiving a pivot pin.

13. The installation and service tool of claim 10 wherein said elongate member defines hexagonal flats on one end.

14. The installation and service tool of claim 10 further including a disc disposed on said elongate member for limiting inward travel of said fingers.

15. The installation and service tool of claim 10 wherein said elongate member is a tube.

16. The installation and service tool of claim 9 wherein the clutch is disposed between the latches of the fingers and the end of the larger diameter region of the housing.

17. A tool for a part comprising:
- a cylindrical member including a first end, a second end, and external threads disposed proximate the first end;
- an annular housing having an interior surface, an exterior surface, a first end and a second end, wherein the interior surface includes a threaded portion proximate the first end engaged with the external threads of the cylindrical member and the exterior surface includes a threaded portion proximate the first end;
- a plurality of fingers each having a body including a first end and a second end, wherein a radially extending surface is disposed on the first end, a latch is disposed proximate the second end perpendicular the body, and the first end of the fingers are pivotably mounted to the housing, and wherein the body of each of the fingers is disposed in the annular housing and the latch of each of the fingers is disposed outside the housing; and
- an annular collar having interior threads engaged with the threaded portion of the exterior surface of the housing, wherein the annular collar is disposed in contact with the radially extending surface of the fingers.

18. The tool of claim 17 wherein the cylindrical member further includes hexagonal flats disposed proximate the second end, a thrust bearing disposed on the first end and an annular disc disposed between the first end and the exterior threads.

19. The tool of claim 17 wherein the latch of each of the fingers is disposed perpendicular the body.

20. The tool of claim 17 wherein the body of each of the fingers is disposed directly adjacent the interior surface of the annular housing.

21. The tool of claim 17 wherein the latch of each of the fingers is disposed proximate the second end of the annular housing.

22. The tool of claim 17 wherein the part is selectively gripped between the latches of the plurality of fingers and the second end of the annular housing.

23. The tool of claim 17 wherein the interior surface of the annular housing defines a cavity, wherein the body of each of the plurality of fingers is at least partially disposed within the cavity and wherein the latch of each of the plurality of fingers is disposed outside of the cavity and is axially aligned with the second end of the annular housing.

* * * * *